(12) United States Patent
Lin et al.

(10) Patent No.: US 7,994,669 B2
(45) Date of Patent: Aug. 9, 2011

(54) FAN MOTOR HAVING FIXING STRUCTURE FOR CIRCUIT BOARD

(75) Inventors: Shih-Kai Lin, Taoyuan Hsien (TW); Ying-Chi Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 425 days.

(21) Appl. No.: 12/000,540

(22) Filed: Dec. 13, 2007

(65) Prior Publication Data

US 2008/0150401 A1   Jun. 26, 2008

(30) Foreign Application Priority Data

Dec. 22, 2006   (TW) ................................ 95148397 A

(51) Int. Cl.
*H02K 7/14* (2006.01)
*H02K 11/00* (2006.01)
*H02K 5/00* (2006.01)

(52) U.S. Cl. ....... 310/67 R; 310/68 R; 310/90; 361/718; 361/719; 361/720; 417/423.12; 417/423.13; 360/245.5

(58) Field of Classification Search ................ 310/67 R, 310/68 R, 90; 361/718–720; 360/245.5; 417/423.12, 423.13
See application file for complete search history.

(56) References Cited

U.S. PATENT DOCUMENTS

| | | | | |
|---|---|---|---|---|
| 4,540,906 | A * | 9/1985 | Blom | 310/67 R |
| 4,682,065 | A * | 7/1987 | English et al. | 310/90 |
| 6,940,195 | B2 * | 9/2005 | Chang et al. | 310/91 |
| 2003/0156366 | A1 * | 8/2003 | Horng et al. | 361/23 |
| 2005/0046286 | A1 * | 3/2005 | Horng et al. | 310/67 R |
| 2005/0052089 | A1 * | 3/2005 | Horng et al. | 310/90 |
| 2005/0088050 | A1 * | 4/2005 | Nishio | 310/90 |
| 2006/0043802 | A1 * | 3/2006 | Sugiyama et al. | 310/67 R |

* cited by examiner

*Primary Examiner* — Quyen Leung
*Assistant Examiner* — Terrance Kenerly
(74) *Attorney, Agent, or Firm* — Birch, Stewart, Kolasch & Birch, LLP

(57) ABSTRACT

A motor comprises a base, a rotor, a stator, and a circuit board. The base includes a sleeve. The stator includes at least one fastener. The sleeve has an inclined outer surface. The fastener extends to the circuit board and abuts the inclined outer surface to fasten the circuit board. A fan comprises a base, a hub, a shaft, a circuit board. The base has a sleeve. The hub comprises a plurality of blades disposed outwardly thereof. The shaft connects to the sleeve and is disposed in the hub. The stator has at least one fastener. The sleeve has an inclined outer surface. The fastener extends to the circuit board and abuts against the inclined outer surface to fasten the circuit board.

14 Claims, 4 Drawing Sheets

FAN MOTOR HAVING FIXING STRUCTURE FOR CIRCUIT BOARD

BACKGROUND OF THE INVENTION

1. Field of the Invention

The invention relates to a fan, a motor and a fixing structure thereof, and more particularly, to a fixing structure fastening the stator of the motor and the circuit board.

2. Description of the Related Art

Motors applying the theory of electromagnetism to transform electricity into mechanical energy, such as transmission devices of fans, optical drives or hard disk drives are commonly used.

Referring to FIG. 1, a conventional motor includes a base 11, a stator 12, a rotor 13 and a circuit board 14. The stator 12 and the circuit board 14 are electrically connected and disposed on a sleeve of the base 11. The stator 12 includes a plurality of silicon steel pieces with a wire winding disposed therearound. The circuit board 14 supplies power to the stator 12 so that the motor 1 can be driven. The rotor 13, disposed corresponding to the stator 12, includes a shaft 131, a magnetically conductive shell 132 and a magnetic ring 133. The shaft 131 and the magnetically conductive shell 132 are connected and disposed on the base 11. The magnetic ring 133 corresponding to the stator 12 is circumferentially disposed on the inner wall of the magnetically conductive shell 132. When the circuit board 14 supplies power to the stator 12, the magnetic force generated by electric current in the wire winding of the stator 12 drives the rotor 13 to rotate.

As the conventional motor 1 shown in FIG. 1, one side of the stator 12 facing the circuit board 14 is provided with a plurality of hooks 15. The circuit board 14 is provided with a plurality of through holes 141 corresponding to the hooks 15. The stator 12 and the circuit board 14 are connected and fastened to the base 11 by insertion of the hooks 15 through the through holes 141. The enameled wiring of the stator 12 electrically connects to the circuit board 14 by the spot welding 142. Vibration of motor 1 while operating, may cause the hooks 15 to easily separate from the through holes 141. Spot welding 142 is also susceptible to fatigue and fracture due to stress concentration. Additionally, the through holes 141, disposed corresponding to the hooks 15, occupy area on the circuit board 14. A distance must separate the wiring of circuit board 14 from the through holes 141 thus product design is difficult.

In view of the described disadvantages of the conventional technology, providing a fan, motor, and fixing structure thereof capable of improving the connection between the stator of the motor and the circuit board and alleviating circuit board layout difficulties is desirable.

BRIEF SUMMARY OF THE INVENTION

The present invention provides a fixing structure for improving the connection between the stator of a motor and the circuit board. The improvement includes a firmer connection between the stator of the motor and the circuit board, an easier printed circuit board (PCB) layout due to the reduction of the area of the through holes on the circuit boards, and promoted product reliability.

In an exemplary embodiment of the fixing structure between the stator of a motor and the circuit board, a motor includes a base, a stator, a rotor, and a circuit board. The rotor, disposed corresponding to the stator, includes a shaft, a magnetically conductive shell and a magnetic ring. The base includes a sleeve. The sleeve is substantially cylindrical with the shaft disposed therein. The sleeve has an inclined outer surface, and the circuit board is disposed outside the sleeve. The stator of the motor includes at least one fastener extending to the circuit board. The fastener abuts the inclined outer surface of the sleeve to fasten the circuit board. A region of the sleeve, which is facing to the rotor, further includes a groove circumferentially disposed thereon. A fastening ring is disposed in the circumferential groove to fasten the stator on the base.

In another embodiment of the fixing structure between the stator of a motor and the circuit board, a motor includes a base, a stator, a rotor, and a circuit board. The rotor, disposed corresponding to the stator, includes a shaft, a magnetically conductive shell and a magnetic ring. The base includes a sleeve. The sleeve is substantially cylindrical. The shaft is disposed in the sleeve. The sleeve has an inclined outer surface, and the circuit board is disposed outside the sleeve. The inclined outer surface of the sleeve includes at least a sliding recess. The stator of the motor includes at least one fastener extending to the circuit board. The fastener is partially or totally disposed in the sliding recess and abuts the inclined outer surface of the sleeve to fasten the circuit board. The region of the sleeve, which is facing to the rotor, further includes a groove circumferentially disposed thereon. A fastening ring is disposed in the circumferential groove to fasten the stator on the base.

In another embodiment of the fixing structure between the stator of a motor and the circuit board, a motor includes a base, a stator, a rotor, and a circuit board. The rotor, disposed corresponding to the stator, includes a shaft, a magnetically conductive shell and a magnetic ring. The base includes a sleeve. The sleeve is substantially cylindrical. The shaft is disposed in the sleeve. The sleeve has an inclined outer surface, and the circuit board is disposed outside the sleeve. The circuit board has edges contacting to the inclined outer surface and at least a notch is formed on the edges. The stator of the motor includes at least one fastener extending to the circuit board and the fastener corresponds to the notch. The fastener is partially disposed in the notch and abuts the inclined outer surface of the sleeve to fasten the circuit board. The region of the sleeve, which is facing to the rotor, further includes a groove circumferentially disposed thereon. A fastening ring is disposed in circumferential groove to fasten the stator on the base.

As described, the invention provides a fan, a motor and fixing structure thereof, wherein at least one fastener abuts the inclined outer surface of the sleeve to fasten the circuit board. The inclined outer surface provides component force to cancel both axial and radial vibrations whereby the fastener tightly fastens the circuit board. Compared with the conventional, the fastener of the invention tightly fastens the circuit board to avoid breakage of the spot welding between the enameled wiring and the circuit board due to vibration. Reliability and efficacy of the product is thus increased. The fixing structure is disposed at inner edges of the circuit board, thus through holes are not required, which is advantageous to circuit board layout. The combination of the circumferential groove on the sleeve and the fastening ring keeps the motor in position when the fastener springs back, thus, promoting product reliability.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

The invention can be fully understood by reading the subsequent detailed description and examples with reference made to the accompanying drawings, wherein the same references are used for elements which are identical or similar in every embodiment.

Figure 1:
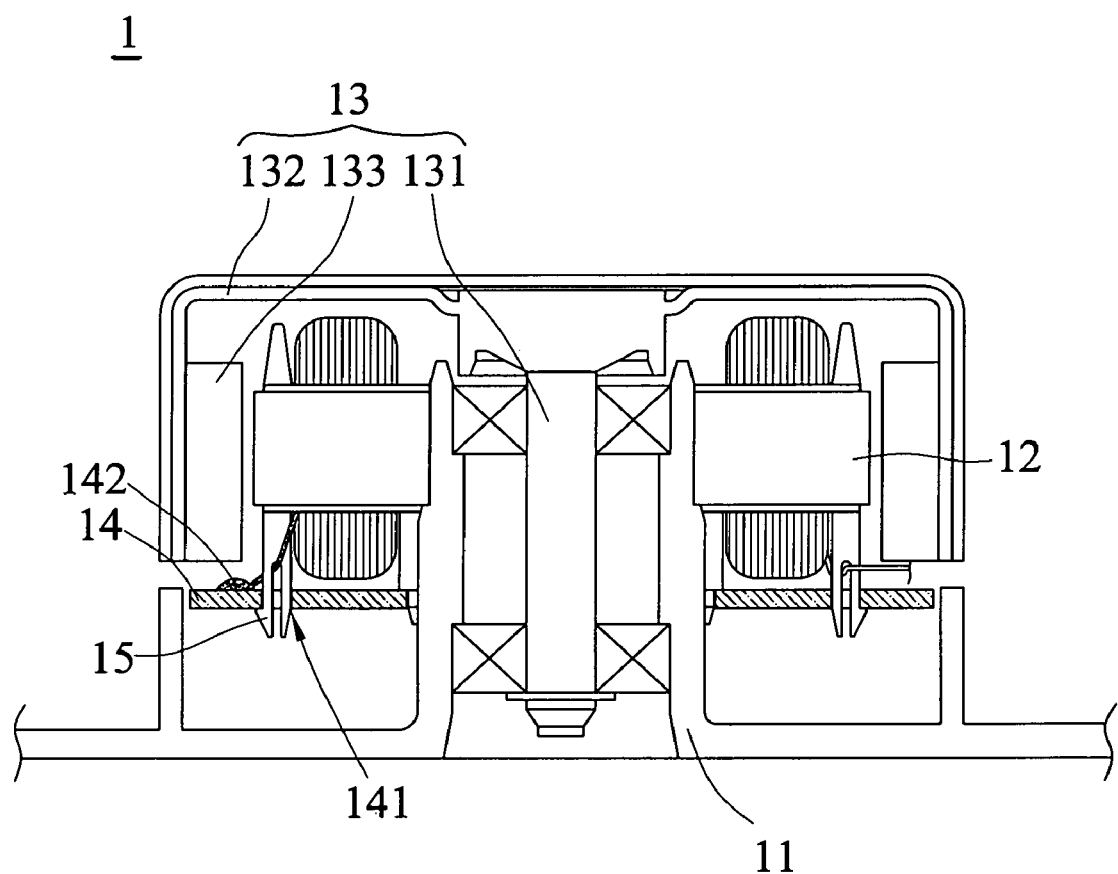
FIG. 1 is a schematic diagram of a conventional motor.
Figure 2:
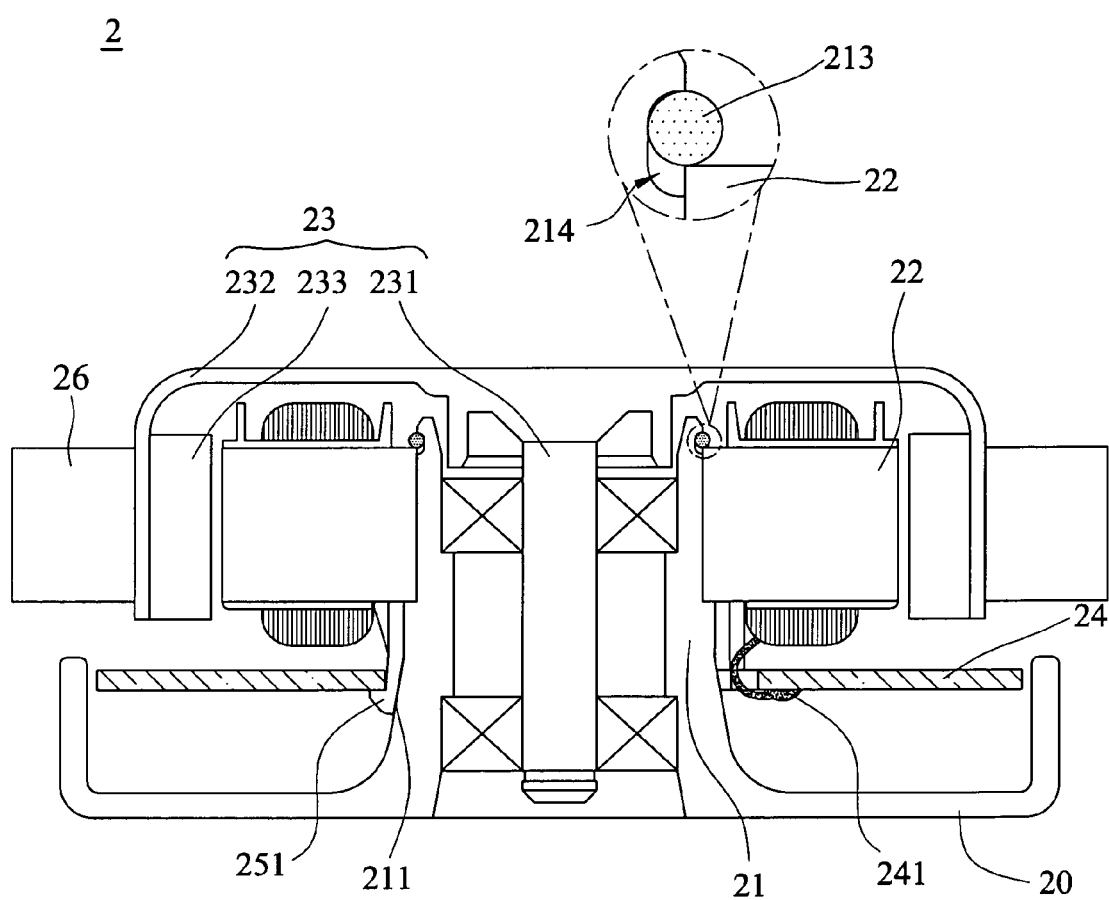
FIG. 2 is a schematic diagram of a motor and a fixing structure thereof in accordance with an embodiment of the invention.

Referring to FIG. 2, a motor 2 includes a base 20, a stator 22, a rotor 23 and a circuit board 24. The stator 22 and the circuit board 24 are electrically connected and disposed on a sleeve 21 of the base 20. In this embodiment, the stator 22 includes a plurality of silicon steel pieces with a wire winding wound therearound. An end of the wire winding electrically connects to the circuit board via spot welding 241. The rotor 23, disposed corresponding to the stator 22, includes a shaft 231, a magnetically conductive shell 232 and a magnetic ring 233. The shaft 231 is connected to the magnetically conductive shell 232 and disposed in the sleeve 21. The magnetic ring 233 corresponding to the stator 22 is circumferentially disposed on the inner wall of the magnetically conductive shell 232. When the circuit board 24 supplies power to the stator 22, the magnetic force generated from the electric current in the wire winding of the stator 12 drives the rotor 23 to rotate.

Also referring to FIG. 2, the motor 2 further includes a fixing structure having at least one fastener 251. An end of the fastener 251 connects to the stator 22. The fastener 251 extends to the circuit board 24 from a side of the stator 22 and fastens the circuit board 24 along the outer wall of the sleeve 21. The fastener 251 is, for example, a hook made of flexible materials. The sleeve 21 has an inclined outer surface 211 having a constant slope or different slopes. The fastener 251 abutting the inclined outer surface 211 effectively fastens the circuit board 24 on the stator 22. Loss of spot welding 241 between the enameled wiring of the motor and the circuit board 24 due to vibration or impact is prevented. Notches (not shown in FIG. 2) are formed at edges of the circuit board 14 and partially receive corresponding fasteners 251.

A circumferential groove 214 is provided on the outer wall of the sleeve 21. A fastening ring 213 is disposed in the circumferential groove 214 and abuts the other side of the stator 22 to fasten the stator 22. Because the stator 22 is fasten by the fastening ring 213 disposed in the circumferential groove 214, separation of the stator 22 from the base 20 due to the restoring force of the fastener 251 can be avoided.

Figure 3A:
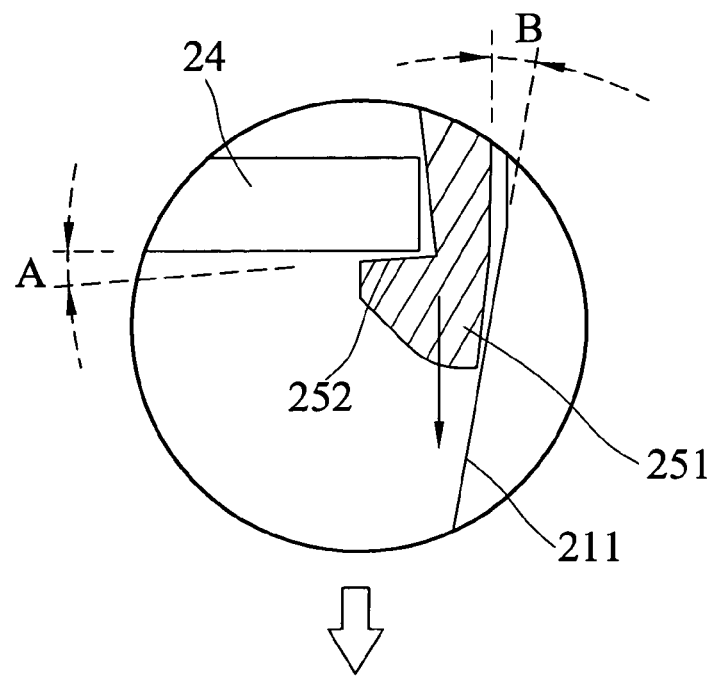
FIGS. 3a and 3b show hooks of a motor fastened to the circuit board via the inclined outer surfaces thereof in accordance with an embodiment of the invention.
Figure 3B:
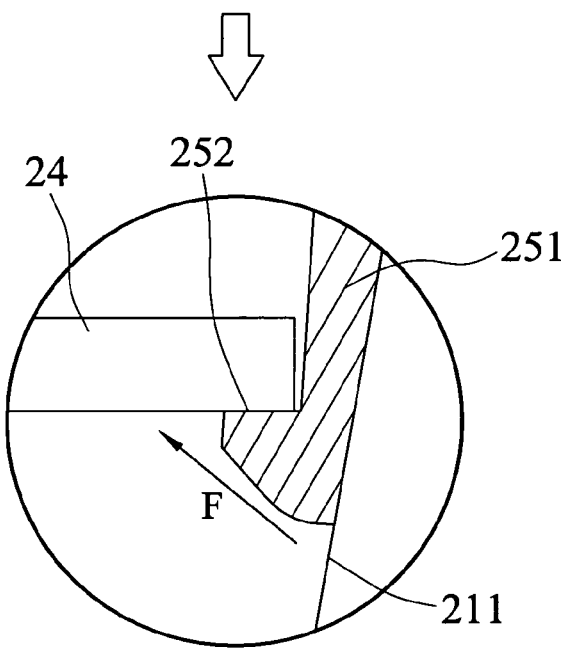

The procedure of fastening the circuit board 24 by the fasteners 251 is described in the following. As shown in FIG. 3a, when the fasteners 251 pass through the circuit board 24 and do not abut the inclined outer surface 211, a fixing surface 252 of the fasteners 251 is inclined relative to the circuit board 24 at an angle A and the fastener 251 is inclined relative to outer surface 211 at another angle B. As shown in FIG. 3b, the fastener 251 forms a tight connection with the inclined outer surface 211, and the inclined outer surface 211 pushes the fasteners 251 toward the circuit board 24, thus fastening the circuit board 24. Note that the fastener 251 forms a tight connection with the circuit board 24 as well as the inclined outer surface 211. The inclined outer surface 211 may have different slopes as shown in FIG. 3a or a constant slop as shown in FIG. 3b.

Figure 4:
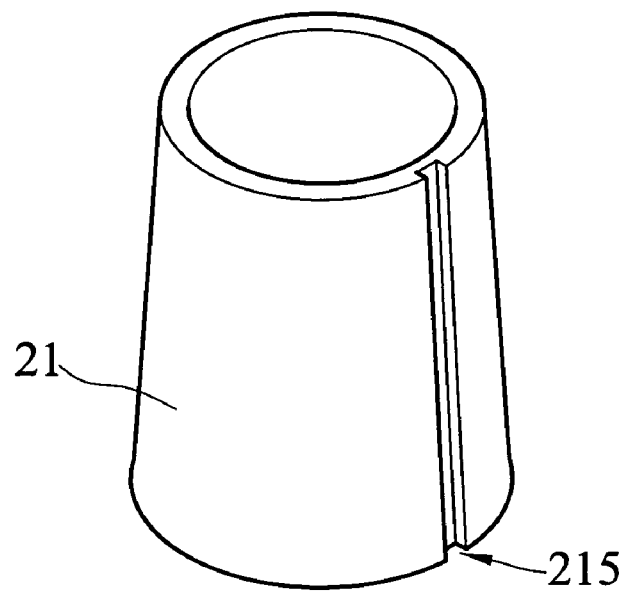
FIG. 4 shows the sleeve of a motor with a sliding recess thereon in accordance with an embodiment of the invention.

As shown in FIG. 4, the sleeve has at least one sliding recess 215 corresponding to the fasteners 251. The fastener 251 can be partially or totally disposed in the sliding recess 215. The sliding recess 215 depends on the quantity of fasteners 251 in number. The number of the sliding recess 215 must exceed or equal to that of fasteners 251. The sliding recess 215 has two side walls, and the constant slope is formed in the sliding recess 215. The side walls and the constant slope of the sliding recess push the fastener 251 toward the circuit board 24.

Figure 5:
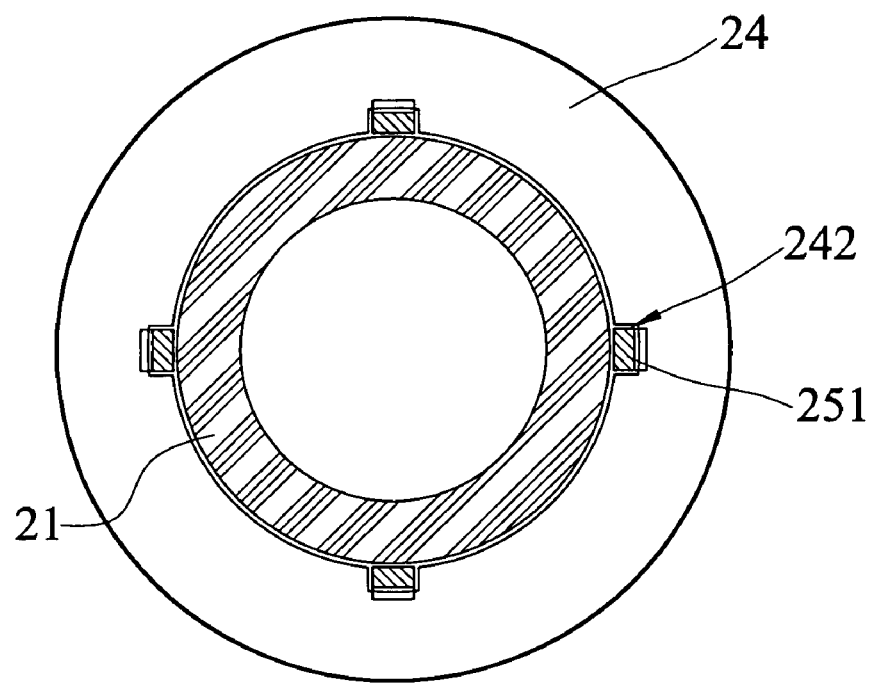
FIG. 5 shows the combination of the circuit board and the sleeve of the motor in accordance with an embodiment of the invention.

In FIG. 5, the circuit board 24 has at least one notch 242 corresponding to the fastener 251. The fastener 251 is partially disposed in the notch 242. The number of notches 242 depends on that of fasteners 251. The number of notches 242 must exceed or equal to that of fasteners 251.

Again referring to FIG. 2, in addition to motors, the invention can also be applied to fans, wherein the rotor 23 of the motor 2 is the hub of a fan with a plurality of blades 26 disposed outwardly thereof, and the base 20 and the sleeve 21 are parts of a continuous-unity fan frame. The embodiment of the fan does fall within the scope of the invention.

As described thereabove, the fastener of the present invention abuts an inclined outer surface of the sleeve to fasten the circuit board. The inclined outer surface provides component force to cancel both axial and radial vibrations whereby the fastener fastens the circuit board. Compared with the conventional hook, the fastener of the invention tightly fastens the circuit board to prevent breakage of the spot welding between enameled wiring and the circuit board due to the vibration generated by the motor. Product reliability and efficacy are thus enhanced. Moreover, the fixing structure with the fastener and the sliding recess is disposed at inner edges of the circuit board to eliminate the need for through holes on the circuit board, thus simplifying circuit board layout. Furthermore, the fastening ring disposed in the circumferential groove on the sleeve keeps the rotor in position when the fastener springs back. Product reliability is thus enhanced.

While the invention has been described by way of example and in terms of preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor comprising:
    a base having a sleeve;
    a rotor;
    a stator having at least one fastener, wherein the fastener is a hook made of a flexible material; and
    a circuit board;
    wherein the sleeve has an inclined outer surface, the fastener extends to the circuit board and abuts the inclined outer surface to fasten the circuit board, wherein the inclined outer surface further comprises a sliding recess for enabling the fastener to be partially or totally disposed therein, the sliding recess has two side walls and a constant slope, and the side walls and the constant slope of the sliding recess push the fastener toward the circuit board.

2. The motor as claimed in claim 1, wherein the stator electrically connects to the circuit board.

3. The motor as claimed in claim 1, wherein the fastener forms a tight connection with the inclined outer surface.

4. The motor as claimed in claim 1, wherein the sleeve further comprises a circumferential groove disposed thereon so that a fastening ring is disposed in the circumferential groove to provide a force downward to fasten the stator.

5. The motor as claimed in claim 1, wherein the number of the sliding recess exceeds or equals to that of the fasteners.

6. The motor as claimed in claim 1, wherein the circuit board has at least a notch for enabling fastener to be partially disposed therein.

7. The motor as claimed in claim 6, wherein the number of notches exceeds or equals to that of fasteners.

8. A fan comprising
a base having a sleeve;
a rotor disposed on the base and having a hub and a plurality of blades disposed around the hub, and a shaft coupled to the hub and disposed in the sleeve;
a stator having at least one fastener, wherein the fastener is a hook made of a flexible material; and
a circuit board;

wherein the sleeve has an inclined outer surface, the fastener extends to the circuit board and abuts against the inclined outer surface to fasten the circuit board, wherein the inclined outer surface further comprises a sliding recess for enabling the fastener to be partially or totally disposed therein, the sliding recess has two side walls and a constant slope, and the side walls and the constant slope of the sliding recess push the fastener toward the circuit board.

9. The fan as claimed in claim 8, wherein the stator electrically connects to the circuit board.

10. The fan as claimed in claim 8, wherein the fastener tightly contacts the inclined outer surface.

11. The fan as claimed in claim 8, wherein the sleeve further comprises a circumferential groove disposed thereon so that a fastening ring is disposed in the circumferential groove to provide a force downward to fasten the stator.

12. The fan as claimed in claim 8, wherein the number of the sliding recess exceeds or equals to that of the fasteners.

13. The fan as claimed in claim 8, wherein the circuit board comprises edges contacting to the inclined surface, and at least a notch for enabling fastener to be partially disposed therein.

14. The fan as claimed in claim 13, wherein the number of the notches exceeds or equals to that of the fasteners.

* * * * *